June 28, 1966  L. R. GLOSTEN  3,257,985
CONNECTING LINKAGE FOR WATERCRAFT
Filed Jan. 17, 1964  7 Sheets-Sheet 1

INVENTOR.
Lawrence R. Glosten
BY
TW Secrest

June 28, 1966   L. R. GLOSTEN   3,257,985
CONNECTING LINKAGE FOR WATERCRAFT
Filed Jan. 17, 1964   7 Sheets-Sheet 2

INVENTOR.
Lawrence R. Glosten
BY
TW Secrest

June 28, 1966   L. R. GLOSTEN   3,257,985
CONNECTING LINKAGE FOR WATERCRAFT
Filed Jan. 17, 1964   7 Sheets-Sheet 4

INVENTOR.
Lawrence R. Glosten
BY
TWSecrest

June 28, 1966   L. R. GLOSTEN   3,257,985
CONNECTING LINKAGE FOR WATERCRAFT
Filed Jan. 17, 1964   7 Sheets-Sheet 5

INVENTOR.
Lawrence R. Glosten
BY
T W Secrest

June 28, 1966 L. R. GLOSTEN 3,257,985
CONNECTING LINKAGE FOR WATERCRAFT
Filed Jan. 17, 1964 7 Sheets-Sheet 6

INVENTOR.
Lawrence R. Glosten
BY
JW Seerest
ATTORNEY

June 28, 1966  L. R. GLOSTEN  3,257,985
CONNECTING LINKAGE FOR WATERCRAFT
Filed Jan. 17, 1964  7 Sheets-Sheet 7

INVENTOR.
Lawrence R. Glosten
BY
T W Secrest
ATTORNEY

United States Patent Office 3,257,985
Patented June 28, 1966

3,257,985
CONNECTING LINKAGE FOR WATERCRAFT
Lawrence R. Glosten, Seattle, Wash., assignor to Sea-Link Incorporated, Vancouver, Wash., a corporation of Washington
Filed Jan. 17, 1964, Ser. No. 338,436
7 Claims. (Cl. 114—235)

This invention relates to linkage for connecting a first watercraft in a pushing relationship with a second watercraft such as a tugboat and a barge for the purpose of having the tugboat push the barge. The linkage comprises at least two spaced-apart connectors on the first watercraft and at least two spaced connectors on the second watercraft with at least one of the connectors on the watercraft restricting horizontal movement between the two watercraft while allowing vertical movement.

There are advantages to having a tugboat push a barge as contrasted with a tugboat pulling a barge. In many countries, including the United States, river barges operating in comparatively smooth water are pushed by tugboats instead of being pulled by tugboats. In fact, a tremendous volume of goods is moved in this manner, and, sometimes, numerous barges are made into large fleets in an end-to-end relationship and in a side-by-side relationship. While pushing operations have sometimes been attempted in bays and sounds and other bodies of moderately rough water, these pushing operations have generally not been successful. And, to an even greater extent, open ocean operations have not been successful. When operating in waves and rough water, the tugboat and the barge tend to move relative to each other. When the tugboat and the barge are tied together so as to prevent this relative movement, large strains are placed on he gear and equipment. Due to these strains, the tying together of the tug and barge has generally been unsuccessful. Further, prior to my invention, no satisfactory linkage has heretofore been available which would permit the necessary degrees of relative movement while at the same time imposing the degrees of restraint necessary to permit the tug to propel and to control the barge while in a pushing relationship with the barge. With this knowledge of tugboats and, also, having worked around tugboats and having designed marine equipment, I have devised a connecting linkage whereby a tugboat may effectively push a barge in rough water and, yet, which connecting linkage allows certain freedom of movement thus reducing the strain imposed on the linkage. The advantages of my invention are that a tugboat in a pushing relationship with respect to a barge can exercise better control over the barge with respect to stopping and steering because of the semi-rigid connection between the tugboat and the barge; there is no resistance of a towline dragging in the water as there is no towline; a barge may be used which has a relatively low resistance to movement through water as compared with towed barges which have a relatively high resistance to movement through water as towed barges must be formed to resist yaw or swerve from side to side; the tugboat can maintain closer surveillance over the barge because of the close connection between the tugboat and the barge; in rough water the tugboat is afforded protection from waves as the barge proceeds ahead of the tugboat and, as a result, the tugboat may maintain speed for a longer period of time in rough weather conditions as compared with a tugboat towing a barge; there is no danger of losing a towed barge because of the parting of the flexible towline as there is no towline; an expensive and complicated heavy towing winch on the tugboat is not required as there is no towline; the time and effort lost in shortening the towline on entering a harbor or a restricted water area is eliminated; and, my invention may be installed on conventional tugboats and barges.

These and other important objects and advantages will be more particularly brought forth upon reference to the detailed specification of the invention, the appended claims and the accompanying drawings.

The connecting linkage for connecting together a tugboat and a barge, comprises in combination, a pushing member and a steering member. This combination of a pushing member and a steering member must restrain relative motions and rotations between the tugboat and the barge which are confined to the horizontal plane, but may allow all other motions.

Prior to describing the connecting link, a brief word is in order as to the relative motions which must be restrained and the relative motions which may be allowed.

Those relative motions which are confined to the horizontal plane and which must be restrained are surge, side sway and yaw. Surge is a linear, relative motion in the horizontal, longitudinal direction, viz., in the direction of travel. It is clear that, in order for the tugboat to propel the barge, or for the tugboat to stop the barge, this relative motion must be restrained. Next there is side sway. Side sway is a linear relative motion in the horizontal transverse direction, viz., at right angles to the direction of travel. If the tugboat is to control the barge, this relative motion must be restrained. Third, there is yaw. Yaw is a relative rotational motion about a vertical axis. If the tugboat is going to be capable of steering the barge, this relative motion about the vertical axis must be restrained.

Those other relative motions which may be allowed are heave, pitch and roll. Heave is a linear relative motion in the vertical direction and is generally of a periodic nature. A linear relative motion in the vertical direction, which is not of a periodic nature, may result from changes in draft due to changes in loading of the tugboat or of the barge. Heave can result from waves. The two vessels, viz., tugboat and barge, should be left free to move in this sense relative to each other. Next there is roll. Roll is a relative rotational motion about the horizontal longitudinal axis of the tugboat and barge combination and is generally of a periodic nature induced by wave action. Relative rotational motion about the horizontal longitudinal axis may also result from shifts of weight on the tugboat or barge and is known as list. The two vessels should be free to rotate relative to each other in this sense. Third, there is pitch. Pitch is a relative rotational motion about the horizontal transverse axis of the tugboat and barge combination and is generally of a periodic nature induced by wave action. Relative horizontal rotational motion about the horizontal transverse axis of the tugboat and barge combination may also result from shifts of weight on the tugboat and barge and is known as a change in trim. The two vessels should be free to rotate relative to each other in this sense.

In essence, the rigid pushing member and the steering member acting together restrain surge, side sway and yaw of the tugboat relative to the barge i.e., those motions confined to the horizontal plane, and allow relative heave, pitch and roll.

Figure 1:
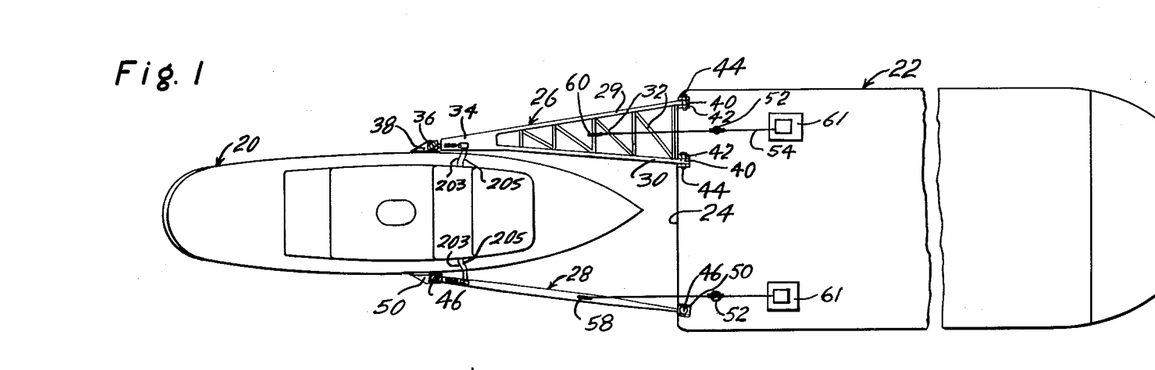
FIGURE 1 is a plan view of a barge and a tugboat using the invention for connecting the tugboat and the barge and which barge has a square stern.

In FIGURE 1 there is illustrated a first watercraft or a tugboat 20 in a pushing relationship with a second watercraft or a barge 22. The barge 22 has a square stern 24.

It is seen that there is a rigid pushing frame 26 connecting the port side of the tug with the port side of the stern of the barge and a steering bar 28 connecting the starboard side of the tugboat to the starboard side of the stern of the barge.

The rigid pushing frame 26 comprises two struts, 29 and 30, connected by bracing members 32. The struts 29 and 30 are at an angle with each other and substantially join at 34 and terminate in a ball 36 so as to form, in essence, a rigid frame member. On the port side of the tug, at approximately midships there is a fitting or socket 38 which fits with the ball 36. As is readily appreciated, the ball-and-socket combination 36 and 38 allow a relatively wide rotation both vertically and horizontally but do not allow a relative longitudinal movement. On the end of the rigid pushing frame 26, the struts 29 and 30 terminate on their spaced-apart ends in a vertically flat member 40 having a passageway therein. On the stern of the barge 22 there are two spaced-apart heavy base members 42. A pin 44 connects the base members 42 with the flat plates 40 so as to allow vertical rotational movement of the rigid pushing frame 26 about the transverse horizontal axis of the pin 44. It is seen that the base members 42, flat plate 40 and pin 44 comprise a hinge which connects the pushing frame 26 and the barge 22 so as to allow rotation relative to each other about one axis only.

The steering bar 28 has on each end a ball 46. At that end which connects with the tugboat 22 at approximately midships, there is a socket 48 on the tugboat. On the stern of the barge, and near the starboard side, there is a socket 50.

From this it is seen that the rigid pushing frame 26 and the steering bar 28, in combination, restrain surge, side sway and yaw between the tugboat and the barge. The pins 44 allow the rigid pushing frame 26 to rotate vertically and in combination with the ball-and-socket members on the rigid pushing frame 26 and the steering bar 28 to allow vertical movement between the tugboat and the barge so as to permit heave and pitch as well as roll.

In essence, the rigid pushing frame 26 and the steering bar 28 allow heave, pitch and roll but restrain surge, side sway and yaw, i.e., those motions confined to the horizontal plane.

It is seen that on the stern of the barge there are two king posts 52. These king posts are upright members and support a hoisting line 54 running over a pulley 56. On the steering bar 28 there is a connector 58 and on the rigid pushing frame 26 there is a connector 60 on a bracing member 32. One hoisting line 54 connects with the fitting 58 and another hoisting line 54 connects with fitting 60. There is a suitable power means such as a motor and a winch combination 61 to draw in the hoisting line 54. It is seen that the ball-and-socket connections at the tugboat can be disengaged and the steering bar 28 and the rigid pushing frame 26 are raised.

On the tugboat there may be an elevated pilothouse 39 for better visibility.

Figure 4:
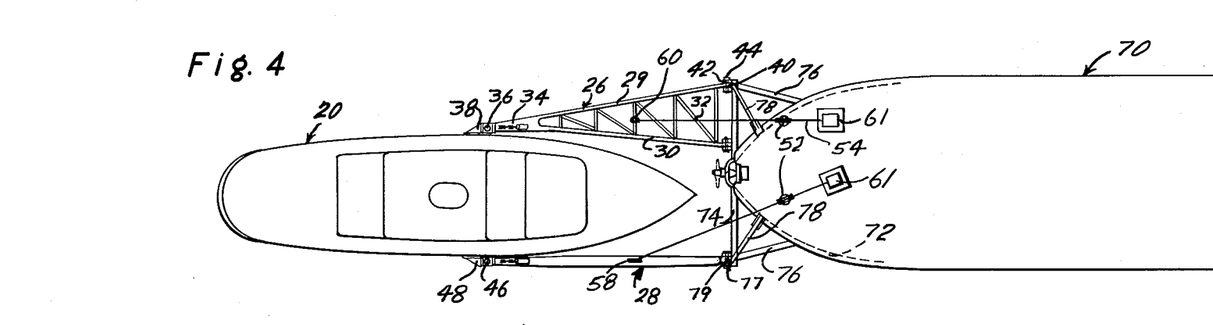
FIGURE 4 is a plan view of a tugboat pushing a barge and which barge has a rounded stern.
Figure 5:
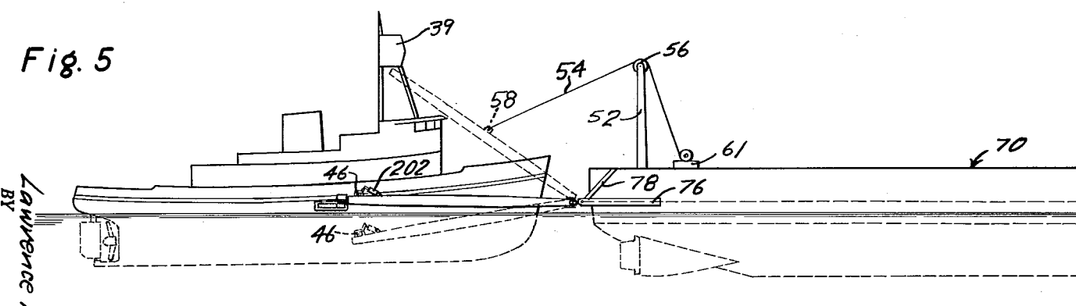
FIGURE 5 is a side-elevational view of the tugboat pushing the barge of FIGURE 4.

In FIGURES 4 and 5 there is illustrated a first watercraft or a tugboat 20 in a pushing relationship with a second watercraft or a barge 70. The barge 70 has a rounded stern 72. At the stern of the barge there is a transverse bar 74. On each end of this transverse bar 74 there is a horizontal support 76 running from the bar to the stern, and, also, an upwardly inclined support 78. As is readily appreciated these struts or supports definitely position the transverse bar 74. Also, it is seen that there is a requirement for the transverse bar as the stern is rounded instead of square as for the barge 22. It is to be realized that the supporting structure for the transverse bar will vary depending on the design requirements. There is a rigid pushing frame 26 and a steering bar 28 connecting the tugboat 20 and the barge 70. As the rigid pushing frame 26 and the steering bar 28 are the same in FIGURES 1 and 2, the same reference numerals will be used. On the transverse bar 74 there are positioned heavy base members 42 with pins 44 connecting 42 to the ends 40 of the members 29 and 30 of the rigid pushing frame 26. Also, there is a pin 77 positioned on the starboard side of the transverse bar 74 and connecting with a universal joint 79 on the steering bar 28.

Again the rigid pushing frame 26 and the steering bar 28 allow heave, pitch and roll but restrain surge, side sway and yaw, i.e., those motions confined to the horizontal plane.

From FIGURES 4 and 5 it is seen that it is possible for my invention to be employed with a barge having a square stern or a rounded stern.

Figure 2:
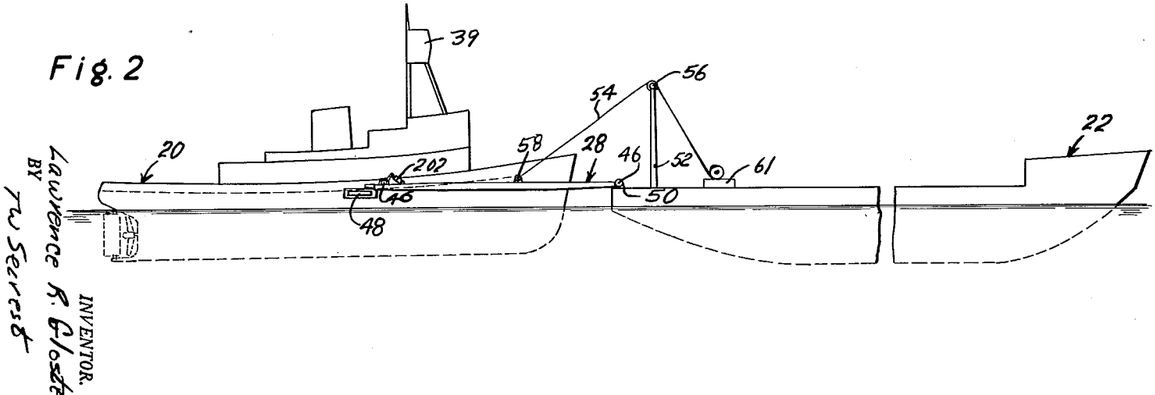
FIGURE 2 is a side-elevational view of a tugboat pushing a barge.

On the stern of the barge there are two king posts 52, motor and winch combination 61, pulley 56 and hoisting line 54 as described with reference to FIGURES 1 and 2. The rigid pushing frame 26 and the steering bar 28 may be disconnected at the tugboat 20 and the frame 26 and the bar 28 may be raised on the barge.

Figure 3:
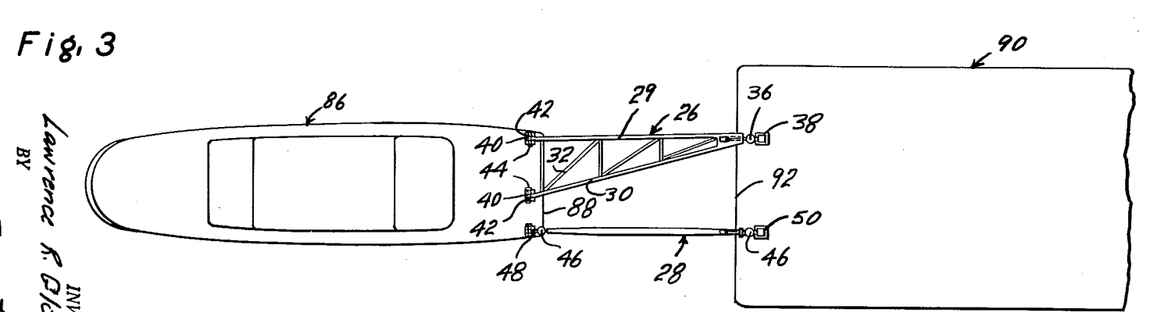
FIGURE 3 is a plan view of a tugboat pushing a barge and with the connecting linkage between the tugboat and the barge reversed from that illustrated in FIGURE 1.

In FIGURE 3 there is illustrated a first watercraft or a tugboat 86 in a pushing relationship with a second watercraft or a barge 90. This tugboat 86 has a square bow 88. The barge 90 has a square stern 92. A rigid pushing frame 26 and a steering bar 28 connect the tugboat 86 and the barge 90. It is seen that on the front of the tugboat 86 there are heavy base members 42 and a pin 44 connecting members 42 with the flat end 40 of the struts 29 and 30 of the rigid pushing frame 26. On the stern of barge 90 there is a socket 38 which fits with the ball 36 on the end of the pushing frame 26. On the bow of the tugboat, starboard side, there is a socket 48 and on the stern of the barge 90 there is a socket 50. On the ends of the steering bar 28 there are balls 46 which fit with the sockets 48 and 50.

From FIGURE 3 it is seen that it is possible to mount the rigid pushing frame 26 and the steering bar 28 on the bow of the tug. When not in use these two frames may be raised. One of the advantages of mounting the frames on the tugboat is that all that is necessary to be mounted on the stern of the barge are the sockets 38 and 50. The cost of the sockets 38 and 50 as compared to the frames 26 and 28 is relatively small.

Figure 6:
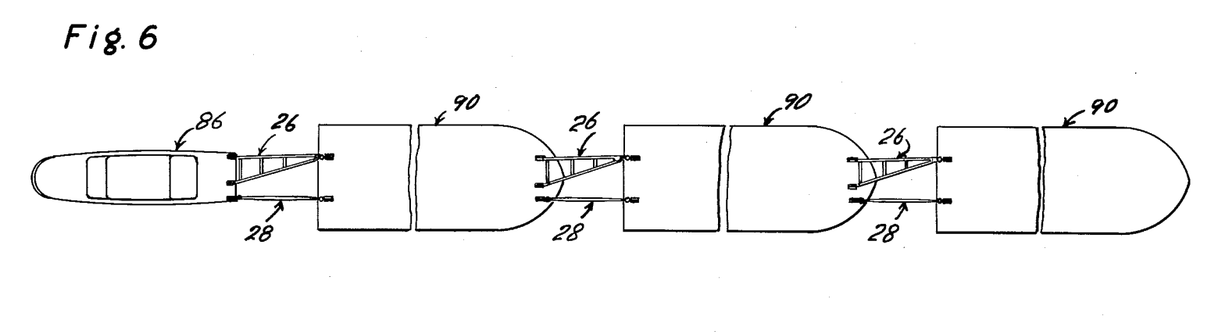
FIGURE 6 is a plan view of a tugboat pushing a multiplicity of barges and with said tugboat and said barges being connected by the connecting linkage of my invention.

In FIGURE 6 there is illustrated a first watercraft or a tugboat 86 in a pushing relationship with a second watercraft or a multiplicity of barges 90. It is seen that these barges and the tugboat are in a straight-line configuration. In fact, the first and second barges to the right of the tugboat 86 are both in a pushing relationship with respect to the watercraft immediately to the right and in a pushed relationship with respect to the watercraft immediately to the left. Connecting the tugboat with the first barge 90 is a rigid pushing frame and a steering bar 28. Connecting the first barge 90 with the second barge 90 is a rigid pushing frame 26 and a steering bar 28. Connecting the second barge 90 with the third barge 90 is a rigid pushing frame 26 and a steering bar 28. The connection between 26 and 28 and the tugboat and barges is by appropriate hinge members, ball-and-socket combinations and universal joints. It is to be realized that there may be more than three barges in a straight-line configuration.

Figure 7:
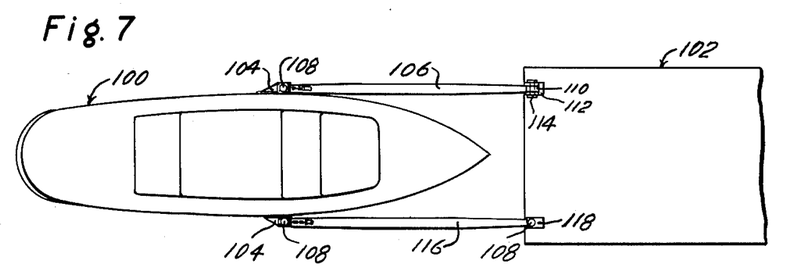
FIGURE 7 is a plan view of a tugboat and barge combination with another species of the connecting linkage between the tugboat and barge, and with a fixed horizontal pivot on the barge.

In FIGURE 7 there is illustrated another combination of a first watercraft or a tugboat 100 in a pushing relationship with a second watercraft or a barge 102. At approximately midships of the tugboat 100, on both the port side and the starboard side, there are sockets 104. A pushing bar 106 having a ball 108 on one end connects with a socket 104 on the port side of the tugboat. The other end of the pushing bar 106 ends in a vertically flat member 110 having a passageway therein. On the port side stern of the barge there is a hinge member 112. A pin 114 connects the hinge member 112 with the flat member 110 so as to allow rotation of the pushing bar 106 about the horizontal transverse axis of pin 114. As is readily appreciated the flat member 110, hinge member 112 and pin 114 comprise a hinge. On the starboard side there is a steering bar 116 having balls 108 at each end. On the starboard stern of the barge 102 there is a socket member 118. The balls 108 of the steering bar 116 fit with the sockets 104 and 118 to connect the tugboat 100 and the barge 102. It is seen that the combination of the pushing bar 106 and the steering bar 116 allow heave, pitch and roll but restrain surge, side sway and yaw, i.e., those motions confined to the horizontal plane.

Figure 10:
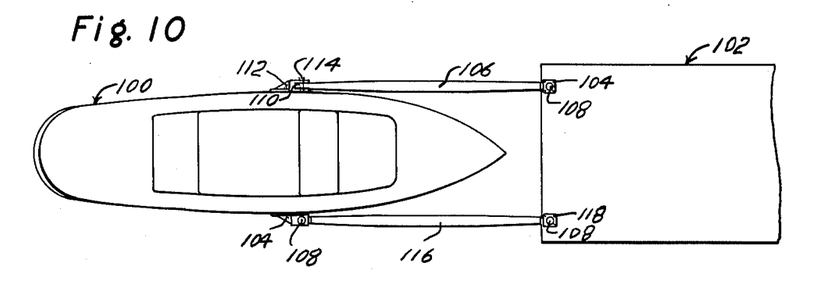
FIGURE 10 is a plan view of a tugboat and a barge combination similar to FIGURE 7 but with a fixed horizontal pivot on the tugboat.

In FIGURE 10 there is illustrated a tugboat and barge combination similar to the combination of FIGURE 7 except that the hinge member 112 is on the tugboat 100 and there are two sockets 104 on the stern of the barge 102. Again, there is freedom of vertical movement of the pushing bar 106 and restriction of the horizontal movement of the pushing bar 106.

FIGURES 7 and 10 show that the hinge, viz., 110, 112 and 114 may be juxtapositioned with respect to either the first watercraft or tugboat in a pushing relationship with respect to a second watercraft or barge in a pushed relationship.

Figure 8:
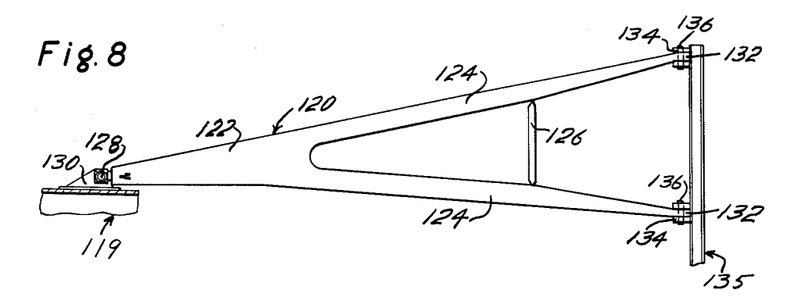
FIGURE 8, on an enlarged scale, is a plan view of a modification of the pushing frame between the barge and the tugboat.

In FIGURE 8 there is illustrated another species of a pushing frame 120 having a main body member 122 and two legs 124. A strut 126 braces the two legs 124. On the end of the main body member 122 is a ball 128. This ball mates with a socket member 130 on a tugboat 119. On the end of each leg 124 there is a flat member 132. Each of the flat members 132 is connected to a hinge member 134 on a barge 135 by means of a pin 136. The flat member 132, hinge member 134 and pin 136 comprise a hinge. The socket 130 may be on a tugboat or barge, as the use necessitates. Also, the hinge member 132 may be on a tugboat or barge as the use necessitates.

Figure 9:
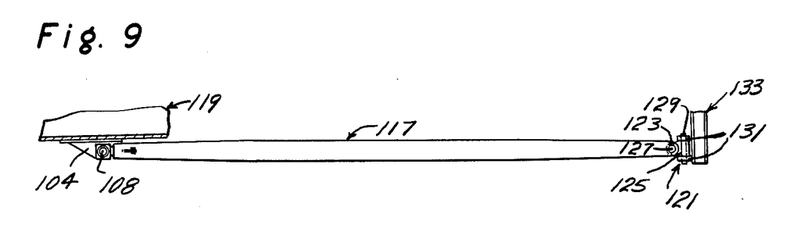
FIGURE 9 is a plan view of a steering bar having a universal joint.

In FIGURE 9 there is illustrated a steering bar 117 having on one end a ball 108 for fitting with a socket 104 on a tugboat 119, only fragmentarily shown. On the other end of the steering bar 117 there is a universal joint 121 having a fixed yoke 123 and a movable yoke 125 joined by pin 127. On the stern of a barge 133 are two base or hinge members 131. The movable yoke 125 is joined by pin 129 to hinge members 131. From this it is seen that a ball-and-socket combination and a universal-joint connection can be used interchangeably.

The pushing bar 106, the steering bar 116 and 117 and the pushing frame 120 are of a hollow water-tight tubular construction so as to be capable of floating on water. The advantage is obvious as, if one is dropped overboard, then it is possible to easily retrieve the unit.

Figure 11:
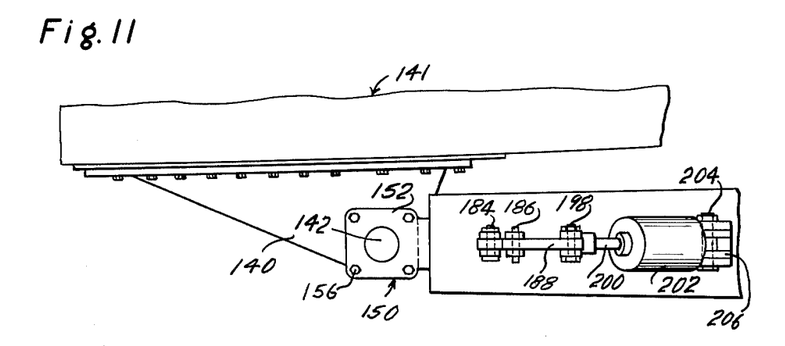
FIGURE 11, on an enlarged scale, is a plan view of a quick release mechanism for the connecting linkage.
Figure 12:
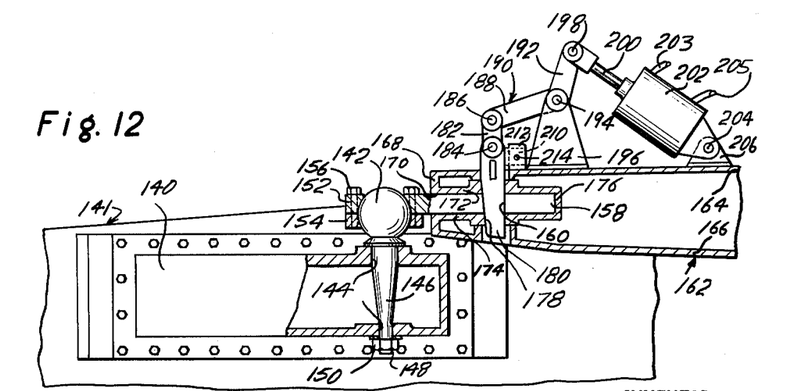
FIGURE 12 is a side-elevational view of the quick release mechanism.

In FIGURES 11 and 12 there is illustrated a ball-and-socket combination which may be used in an emergency. More particularly, during heavy seas or rough weather or if the tugboat or barge is sinking it may be necessary to quickly release the tugboat and the barge from each other. With this ball-and-socket combination it is possible to quickly free the tug and barge.

It is seen that there is a base 140 for mounting a ball 142. This base 140 is on the side of a tugboat 141. In the base 140 there are two passageways 144. The ball 142 is integral with a shank 146. The lower end of the shank 146 protrudes through the passageways 144 and is externally threaded at 148. A nut 150 is screwed onto the lower end of 146 to firmly position the ball 142 in the base 140. A socket member comprising an upper plate member 152 and a lower plate 154 connected by bolts 156 mates with ball 142. The upper plate member 152 has a tongue portion 158. In this tongue portion there is a passageway 160. The tongue fits into a recess. More particularly, there is a support 162 comprising a top plate 164, a bottom plate 166 and an end plate 168. The support may be the rigid pushing frame, steering bar or pushing frame. In the end plate 168 there is an opening 170. Attached to the upper and lower parts of the end plate 168 is an upper plate 172 and a lower plate 174. An end plate 176 connects the inner edges of the plates 172 and 174. In the top plate 164, the bottom plate 166, the upper plate 172 and the lower plate 174, there is a passageway 178. Upon the alignment of the passageways 178 and 160 a pin 180 is positioned in these passageways so as to firmly position the tongue portion 158 and the ball 142. An arm 182 is attached to the upper part of the pin 180 by a pin 184. The upper end of the arm 182 is connected by a pin 186 to a leg 188 of bell crank 190. The bell crank 190 has another leg 192, and is connected by means of a pin 194 to a support stand 196 on the top plate 164. The leg 192 connects, by means of a pin 198, to a plunger 200. The plunger 200 is part of a fluid actuated cylinder 202. The lower end of the cylinder 202 is connected by means of a pin 204 to a support stand 206 on the top plate 164. It is seen that the cylinder 202 and the plunger 200, bell crank 190 and pin 180 provide a quick release mechanism for the ball-and-socket combination from the support 162 upon retracting the plunger 200. The ball-and-socket combination may be on the rigid pushing frame 26, steering bar 28, pushing bar 106, steering bar 116 or pushing frame 120. There are hydraulic fluid lines 203 and 205 connecting with the cylinder and with an appropriate source of fluid under pressure as is well known in the art. The fluid lines may connect with a source of fluid pressure on the tugboat 141.

It is seen that on the upper part of the pin 180 is an ear 210, and on the top plate 164 there is a lug 212. A keeper 214 connects the ear 210 and the lug 212.

Under normal operating conditions the ball-and-socket combination is separated from the tugboat 141 by loosening the nut 150 from the shank 146. Then, the shank 146 is pulled out of the passageways 144 so as to separate the support 162 from the tugboat 141. Conversely, the support 162 and the tugboat 141 are united by inserting the shank 146 into the passageways 144 and screwing the nut onto the shank.

Figure 16:
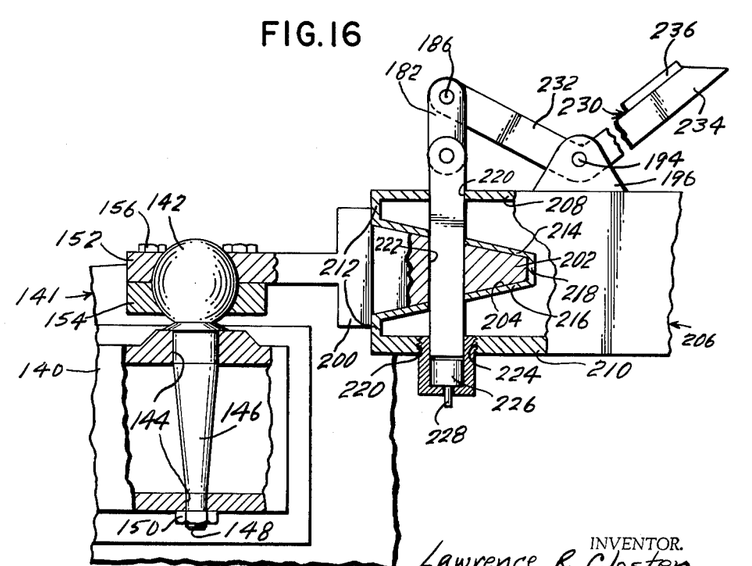

In FIGURE 16 there is illustrated another quick release mechanism for a ball-and-socket combination Where compatible the same reference numerals will be used for like elements in FIGURES 16 and 12.

In FIGURE 16 the upper plate 152 expands into stop 200 and contracts into a tongue or wedge 202. The wedge 202 is received in a recess 204. This recess is in the end of a support 206. The support, as is seen in cross-section, comprises a top plate 208, a bottom plate 210 and an end plate 212. In the end plate 212 there is an opening which divides the end plate 212 into upper and lower parts. A downwardly inclined plate 214 connects with the upper part of 212. And, an upwardly inclined plate 216 connects with the lower part of 212. A plate 218 unites the inner ends of 214 and 216. In the support 206 there is a lateral passageway 220 which connects with the recess 204. In the tongue 202 there is a passageway 222. The passageways 220 and 222 are in alignment to receive pin 180. The lower end of the passageway 220 is tapped to receive casing 224. The casing 224 holds a detonator such as a shotgun shell 226 and has a firing pin 228 in its lower end. In case of an emergency a crewman can hit the firing pin with a hammer to detonate the shell 226 so as to eject the pin 180 out of the passageways 220 and 222. This allows the support 206 and the tugboat 141 to separate. An alternative quick release mechanism is by means of a bell crank 230. This bell crank comprises a first leg 232 and a second leg 234. The first leg 232 is attached by the pin 186 to the upper end of the arm 182. The inner surface of the leg 234 is reinforced to provide a striking surface 236. In case of an emergency a crewman may hit the surface 236 with a hammer or maul so as to raise the pin 180 out of the passageways 220 and 222 to allow the support 206 and the tugboat 141 to separate. The support 206 may be the rigid pushing frame, steering bar or pushing bar or pushing frame and may be attached to the tugboat or on the barge.

Figure 13:
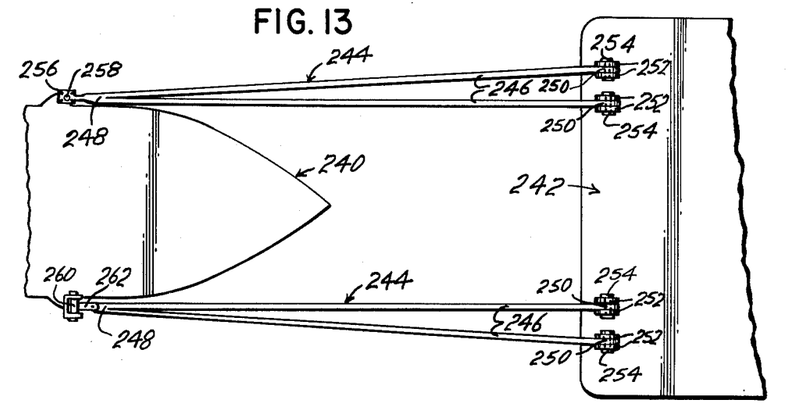
FIGURE 13 is a plan view of another connecting linkage between a first watercraft in a pushing relationship with a second watercraft.

In FIGURE 13 there is illustrated a variation of the connecting linkage between a first watercraft or tugboat 240 in a pushing relationship with a second watercraft or barge 242. This variation comprises two pushing frames 244. Each of these pushing frames has two legs 246. These two legs unite at a common base 248. The free end of each leg 246 terminates in a vertically flat member 250. On the stern of the barge 242 there are located base members 252. A pin 254 connects the flat member 250 and the base members to provide a hinge which allows relative vertical rotation between the tugboat 240 and the barge 242 but restricts relative horizontal movement. On the port side of the tugboat 240 there is a socket member 256 which mates with a ball 258 on the base 248. On the starboard side of the tugboat 240 there is a pin 260 which connects with a universal joint 262 on the base 248. Again, it is seen that a ball-and-socket combination and a universal joint may be used interchangeably.

With the two pushing frames 244 connecting the tugboat 240 and the barge 242 it is seen that those motions confined to the horizontal plane, viz., surge, side sway and yaw, are restrained, but heave and pitch are allowed. Roll is considerably restricted but allowed to a degree. The frames are of such proportions as to allow some elastic deflection permitting some degree of roll between the tugboat and the barge.

Although, in FIGURE 13, the ball-and-socket combination and the universal joint are associated with the tugboat 240 it is to be realized that the ball and socket and universal joint may be associated with the barge 242. Likewise, the hinge members 250, 252 and 254 may be associated with the tugboat 240 instead of with the barge 242.

Figure 14:
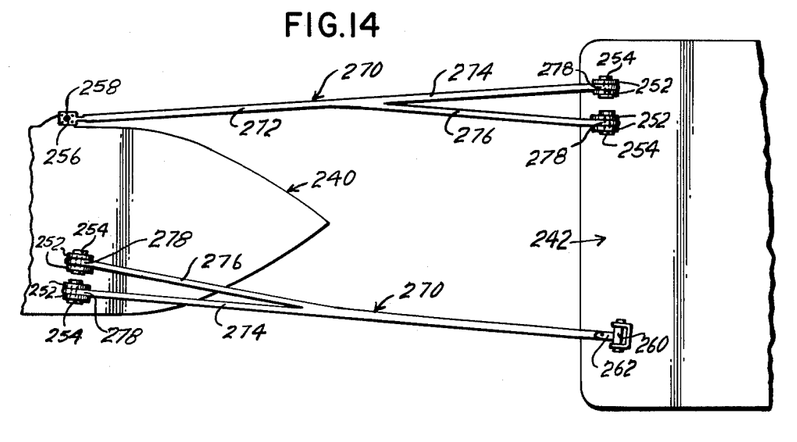
FIGURE 14 is a plan view of another connecting linkage between a first watercraft in a pushing relationship with a second watercraft.

In FIGURE 14 there is illustrated another variation of the connecting linkage between a first watercraft or tugboat 240 in a pushing relationship with a second watercraft or barge 242. This variation comprises two pushing frames 270. Each frame comprises a main member 272 which branches into two legs 274 and 276. Each leg terminates in a vertically flat member 278. A pin 254 connects the flat member 278 with the base members 252. The frame 270 which connects the port side of the tugboat with the barge has a ball 258 which connects with a socket 256 on the tugboat. The hinge members 278, 252 and 254 are associated with the barge 242.

The frame on the starboard side of the tugboat 240 has a universal joint 262 on the free end of the main member 272. This universal joint connects with a pin 260 on the starboard side of the stern of the barge. The base members 252 are mounted on the tugboat 240, and are connected by the pin 254 to the flat members 278.

Again, it is seen that a ball and socket may be used interchangeably with a universal joint. Also, all of the hinge members may be on the barge or on the tugboat as well as one set of hinge members on the tugboat and the other set of hinge members on the barge.

Further, the two pushing frames 270 allow heave and pitch but restrain surge, side sway and yaw. These frames are of such proportions as to allow some elastic deflection permitting some degree of roll between the tugboat and the barge.

Figure 15:
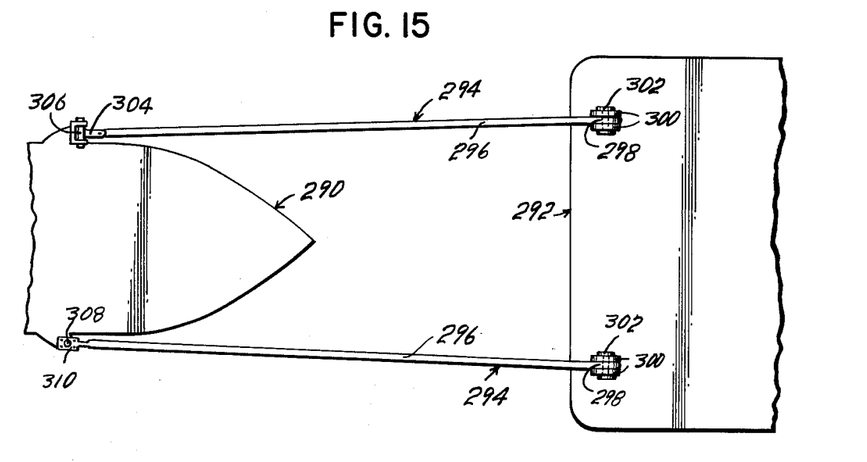
FIGURE 15 is a plan view of another connecting linkage between a first watercraft in a pushing relationship with a second watercraft and with said linkage comprising two spaced-apart members; and, FIGURE 16 is a fragmentary side-elevational view of another quick release ball-and-socket connection.

In FIGURE 15 there is illustrated another connecting linkage between a first watercraft or tugboat 290 in a pushing relationship with a second watercraft or barge 292. The connecting linkage comprises two spaced-apart pushing bars 294 having a main body portion 296. One end of 296 terminates in a hinge portion 298. On the barge there is a base 300. A pin 302 having its axis transverse to the longitudinal axis of the barge connects 298 and 300 so as to allow the bar 294 to rotate vertically but restricts horizontal motion. The bar 294 on the port side of the tugboat has a universal joint 304 which connects with a pin 306 on the tugboat. The bar 294 on the starboard side of the tugboat connects by a ball 308 with a socket 310 on the tugboat. Again, it is seen that a ball and socket may be used interchangeably with a universal joint. Also, all of the hinge members 298, 300 and 302 may be on the barge or on the tugboat, or one set of hinge members may be on the barge and another set of hinge members on the tugboat.

The pushing bars 294 allow heave and pitch but restrain surge, side sway and yaw. The frames are of such proportions as to allow some elastic deflection permitting some degree of roll between the tugboat and the barge.

From the foregoing it is seen that the connecting linkage of FIGURES 13, 14 and 15, e.g., 240, 270 and 294, may be used in sheltered waters such as bays, sounds, lakes and rivers as compared with connecting linkage of FIGURES 1, 3, 4, 7, 8, 9 and e.g., 26, 28, 106, 116, 117 and 120, which may also be used in open waters such as ocean going operations.

From the foregoing it is seen that I have provided means where a first watercraft can be linked to a second watercraft or a multiplicity of watercraft. This is made possible by my linkage comprising spaced-apart connecting members for connecting adjacent watercraft. At least one of these connectors in its connection with the watercraft is restricted in its motion to a vertical motion. This connection is by a hinge means which allows the connecting member to move in a vertical plane about an axis transverse to the longitudinal axis of the two adjacent watercraft. The other connections of the connecting members to the watercraft may be such as to allow both vertical and horizontal movement, and combinations thereof, between the connecting member and the watercraft. Also, it is appreciated that these connecting members restrict relative longitudinal movement between the watercraft. In the manufacture of the connecting members and the connecting of the ball-and-socket members and universal joints to these members and the watercraft there may be employed well known conventional means and methods. Although in the drawings the pushing frame is illustrated as connecting with the port sides of the tugboat and the barge and the steering bars connecting with the starboard sides it is to be realized that the pushing frame may connect with the starboard sides of the tugboat and the barge and the steering bars connect with the port sides of the tugboat and the barge.

What I claim is:

1. Linkage connecting a first watercraft and a second watercraft comprising:
    (a) a first connecting bar connecting together the first and second watercraft;
    (b) a second connecting bar connecting together the first and second watercraft;
    (c) said first and second connecting bars being in a substantially parallel, spaced-apart relation;
    (d) one of the connecting bars being connected to one of the watercraft by means which permit relative movement between such connecting bar and such watercraft only in a swinging manner about an athwartships axis and prevent appreciable relative yawing of the two watercraft;
    (e) said one of the connecting bars being connected to the other watercraft by means which permit both up and down and sidewise swinging of such connecting bar relative to the other watercraft;
    (f) and the other connecting bar being connected to the watercraft by means which permit both relative rolling and pitching of the two watercraft.

2. Linkage connecting a first watercraft and a second watercraft, said first watercraft being in pushing relation to said second watercraft, said linkage comprising:
    (a) a pushing bar and a steering bar in substantially parallel spaced relation;
    (b) said pushing bar being connected to the second watercraft by connecting means which permit the pushing bar to move relative to the second watercraft only in a swinging manner about an athwartships axis;
    (c) said pushing bar being connected to the first watercraft with connecting means which allow the pushing bar both to swing about an athwartships axis and to swivel about an axis generally parallel to its length relative to the first watercraft;
    (d) and said steering bar being connected to both the first and second watercraft with connecting means which allow swinging of the steering bar about athwartships axes and swivelling about an axis generally parallel to the length of the steering bar relative to both watercraft.

3. The linkage defined in claim 2, in which the pushing bar and the steering bar are of hollow tubular watertight construction.

4. Linkage connecting a first watercraft and a second watercraft, said first watercraft being in pushing relation to said second watercraft, said linkage comprising:
    (a) a pushing bar and a steering bar in substantially parallel spaced relation;
    (b) said pushing bar being connected to the first watercraft by connecting means which permit the pushing bar to move relative to the first watercraft only in a swinging manner about an athwartships axis;
    (c) said pushing bar being connected to the second watercraft with connecting means which allows the pushing bar both to swing about an athwartships axis and to swivel about an axis generally parallel to its length relative to the second watercraft;
    (c) and said steering bar being connected to both the first and second watercraft with connecting means which allow both swinging of the steering bar about athwartships axes and swivelling about an axis generally parallel to the length of the steering bar relative to both watercraft.

5. Linkage connecting a first watercraft and a second watercraft comprising:
    (a) a first connecting member connecting together the first and second watercraft;
    (b) and a second connecting member connecting together the first and second watercraft;
    (c) said first and second connecting members being in spaced relation;
    (d) one of said connecting members being connected to one of the watercraft by a ball-and-socket connection allowing relative swinging between such member and the watercraft both about a vertical axis and about a horizontal axis;
    (e) said ball-and-socket connection including a tongue integral with the socket;
    (f) a passageway in said tongue;
    (g) a support;
    (h) a passageway in said support;
    (i) said passageways in said tongue and in said support being capable of being aligned;
    (j) a pin in said passageways to position said tongue and said support with respect to each other;
    (k) means to remove said pin quickly from said passageways to allow said tongue and said support to separate;
    (l) and a receiver for a detonator positioned under said pin to eject it from the passageways.

6. Linkage connecting a first watercraft and a second watercraft comprising:
    (a) two spaced pushing bars;
    (b) each pushing bar being connected to one of the watercraft by means which permit only relative swinging of said pushing bar about an athwartships axis relative to said one of the watercraft and being connected to the other watercraft by means which allow both of said pushing bars to swing about an athwartships axis and to swivel about axes generally parallel to the lengths of said pushing bars relative to the other watercraft.

7. The combination of
    (a) a first watercraft;
    (b) a second watercraft;
    (c) said first watercraft being in pushing relation to said second watercraft;
    (d) and two spaced pushing bars;
    (e) each pushing bar being connected to one of said watercraft by means which permit only relative swinging of said pushing bar about an athwartships axis relative to said one of the watercraft and being connected to the other of said watercraft by means which allow both of said pushing bars to swing about an athwartships axis and to swivel about axes generally parallel to the lengths of said pushing bars relative to the other end of said watercraft.

References Cited by the Examiner
UNITED STATES PATENTS

| 612,539 | 10/1898 | Bowick | 114—236 X |
| 1,038,676 | 9/1912 | Stevens | 114—236 |
| 3,062,170 | 11/1962 | Verneaux | 114—235 |
| 3,125,059 | 3/1964 | Verneaux | 114—235 |

FOREIGN PATENTS

| 1,297,491 | 5/1962 | France. |

MILTON BUCHLER, *Primary Examiner.*

FERGUS S. MIDDLETON, *Examiner.*

T. M. BLIX, *Assistant Examiner.*

UNITED STATES PATENT OFFICE
CERTIFICATE OF CORRECTION

Patent No. 3,257,985                          June 28, 1966

Lawrence R. Glosten

It is hereby certified that error appears in the above numbered patent requiring correction and that the said Letters Patent should read as corrected below.

Column 10, line 58, strike out "end".

Signed and sealed this 1st day of August 1967.

(SEAL)
Attest:

EDWARD M. FLETCHER, JR.                      EDWARD J. BRENNER
Attesting Officer                                Commissioner of Patents